United States Patent [19]

Gaalema et al.

[11] Patent Number: 5,500,748
[45] Date of Patent: Mar. 19, 1996

[54] LIQUID CRYSTAL SPATIAL LIGHT MODULATOR INCLUDING AN INTERNAL VOLTAGE BOOSTER

[75] Inventors: Stephen D. Gaalema, Colorado Springs; Mark A. Handschy, Boulder, both of Colo.

[73] Assignee: Displaytech, Inc., Boulder, Colo.

[21] Appl. No.: 187,592

[22] Filed: Jan. 26, 1994

[51] Int. Cl.[6] .............................................. G02F 1/1343
[52] U.S. Cl. ................................................ 359/55; 359/59
[58] Field of Search ................................ 359/54, 55, 57, 359/58, 59; 345/92

[56] References Cited

U.S. PATENT DOCUMENTS

| | | | |
|---|---|---|---|
| 4,233,603 | 11/1980 | Castleberry | 359/58 |
| 4,758,831 | 7/1988 | Kasahara | 345/92 |
| 4,792,210 | 12/1988 | Maurice | 359/59 |

FOREIGN PATENT DOCUMENTS

| | | | |
|---|---|---|---|
| 0010619 | 1/1987 | Japan | 359/59 |

OTHER PUBLICATIONS

IBM Technical Disclosure Bulletin (TDB) vol. 22 #6 Nov. '79 pp. 2507–2508.
IBM TDB vol. 33 #1A Jun. '90 pp. 481–482.

Primary Examiner—William L. Sikes
Assistant Examiner—Teep H. Nguyen
Attorney, Agent, or Firm—Stephen C. Shear

[57] ABSTRACT

There is disclosed herein a liquid crystal spatial light modulator which includes, among other components, a layer of liquid crystal material which changes the way in which it acts on light in response to predetermined changes in voltage across the layer, whereby to modulate the light so acted upon, and an arrangement for applying a light modulating voltage across the layer of liquid crystal material and for modulating the voltage during a given modulation period. This latter arrangement includes a non-linear capacitor and a voltage coupling scheme for changing the voltage across the capacitor during the modulation period in a way which changes the capacitance of the capacitor and thereby capacitively couples at least a part of the change in voltage across the capacitor to the layer of liquid crystal material.

10 Claims, 2 Drawing Sheets

LIQUID CRYSTAL SPATIAL LIGHT MODULATOR INCLUDING AN INTERNAL VOLTAGE BOOSTER

GOVERNMENT CONTRACT CLAUSE

This invention was made with Government support under contract DAAL02-89-C-0012 awarded by the U.S. Army. The Government has certain rights in this invention.

BACKGROUND OF THE INVENTION

The present invention relates generally to liquid crystal spatial light modulators, and more particularly to active matrix liquid crystal spatial light modulators.

Liquid crystal (LC) light modulators directly atop silicon integrated circuits form the basis of matrix addressed spatial light modulator (SLM) technology well suited to information display and optical information processing. This combination permits large arrays of compact "smart" pixels that can utilize the extensive repertoire of functionality available in extreme miniature on silicon VLSI (Very Large Scale Integrated) circuits. Devices made in this way can have array sizes up to 128×128 to 1000×1000, depending on the degree of pixel intelligence. They are similar in size and weight to an ordinary integrated circuit, and typically operate on low voltage (5 volt) power supplies, usually consuming less than 100 mW. The LC modulators of these arrays operate at conventional CMOS voltage levels, with update times as short as 100 micro seconds and efficient, high contrast modulation over wide wave length ranges.

One typical active matrix liquid crystal spatial light modulator in the prior art includes, among other components, a layer of liquid crystal material, for example ferroelectric liquid crystal material, which changes the way in which it acts on light in response to predetermined changes in voltage across the layer, whereby to modulate the light so acted upon. This layer of liquid crystal material is functionally divided into an array of adjacent pixel segments arranged in a predetermined way, typically in a matrix of rows and columns. An addressing scheme is provided for applying a voltage across this array of adjacent pixel segments and for individually modulating the voltage across each pixel segment in a controlled manner in order to modulate the light acted upon by the pixel segments in a correspondingly controlled way. In this typical active matrix liquid crystal spatial light modulator of the prior art, each pixel segment includes associated circuitry for modulating the voltage across the particular pixel segment, that is for changing its voltage, in response to a particular data or address voltage at the input of the circuitry.

A problem associated with the particular prior art device described immediately above resides in the fact that its addressing scheme is voltage limited, that is, the data or addressing voltages must be kept less than some maximum, for example 5 volts which is the standard in many integrated circuits. This is a result of many reasons including power dissipation problems associated with such devices.

As a result of this data or addressing voltage limitation just recited, the maximum voltage change that can possibly appear across the array of adjacent pixel segments making up the typical prior art active matrix liquid crystal spatial light modulator is correspondingly limited. That is, in such devices of the prior art, because the data or addressing voltage is by design limited to, for example, at most 5 volts, the voltage changes across the individual pixel segments (for modulating those segments) have been correspondingly limited to voltage changes somewhat smaller than the maximum data or addressing voltage levels, for example, somewhat less than 5 volts. Devices of the type to which the present invention is directed, for example active matrix ferroelectric liquid crystal spatial light modulators, could be speeded up and thereby improved upon if the voltage increase across the individual pixel segments could be increased without having to increase the data or addressing voltage and without creating power dissipation problems. As will be seen hereinafter, the present invention achieves just that by teaching a way to increase the maximum voltage change across each pixel segment to a level higher than the change of the data or addressing voltage.

SUMMARY OF THE INVENTION

As will be described in more detail hereinafter, there is disclosed herein a liquid crystal spatial light modulator including means for defining a layer of liquid crystal material which changes the way in which it acts on light in response to predetermined changes in voltage across the layer, whereby to modulate the light so acted upon. This liquid crystal spatial light modulator includes an arrangement designed in accordance with the present invention for applying a light modulating voltage across the layer of liquid crystal material and for modulating that voltage during a given modulation period in order to modulate the light acted upon by the liquid crystal material.

This arrangement includes a non-linear capacitor, for example an MOS capacitor or the like, which has one side electrically connected with one side of the layer of liquid crystal material such that the light modulating voltage across the layer at any given point in time during its modulation period is a function of the voltage across the capacitor at that time. The arrangement also includes voltage coupling means for changing the voltage across the capacitor during the modulation period in a way which changes the capacitance of the capacitor and thereby capacitively couples at least a part of the change in voltage from the capacitor to the layer of liquid crystal material. In this way, as will be seen, the maximum light modulating voltage swing across the layer of liquid crystal material can be amplified without increasing the maximum data or addressing voltage used by the overall arrangement to modulate the liquid crystal material.

In a specific embodiment of present invention, the spatial light modulator is an active matrix liquid crystal spatial light modulator. This active matrix device includes a layer of liquid crystal material, specifically ferroelectric liquid crystal, which is functionally divided in to an array of adjacent pixel segments arranged in a predetermined way, specifically in a matrix of rows and columns. Each pixel segment includes its own arrangement of the type described immediately above.

DESCRIPTION OF THE DRAWINGS

The present invention will be described in more detail hereinafter in conjunction with the drawings, wherein.

DETAILED DESCRIPTION

Figure 1:
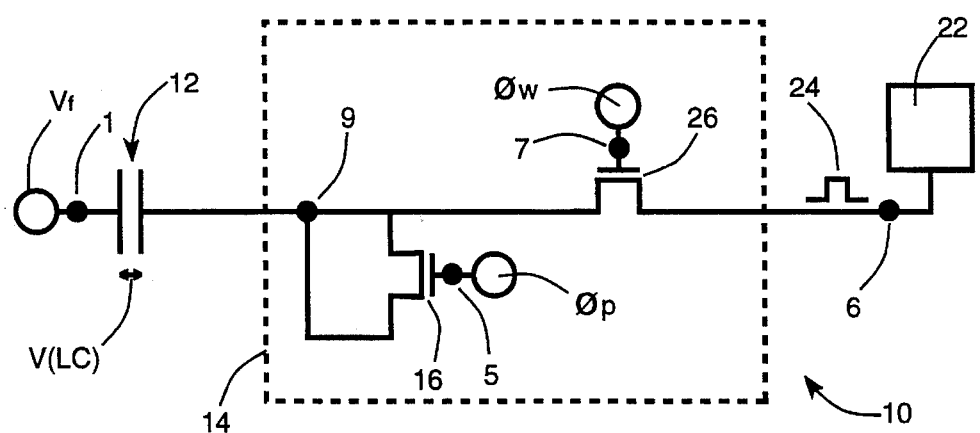
FIG. 1 schematically illustrates a liquid crystal spatial light modulator designed in accordance with the present invention and it also schematically illustrates a one-pixel segment of an overall active matrix liquid crystal spatial light modulator designed in accordance with the present invention.

Turning now to the drawings, wherein like components are designated by like reference numerals throughout the various figures, attention is first directed to FIG. 1. As stated immediately above, FIG. 1 diagrammatically illustrates either a liquid crystal spatial light modulator designed in accordance with the present invention, or a pixelated segment of an overall active matrix liquid crystal spatial light modulator, also designed in accordance with the present invention. For purposes of the immediate discussion, it will be assumed that FIG. 1 depicts an overall liquid crystal spatial light modulator which is generally indicated by the reference numeral 10. Liquid crystal spatial light modulator 10 includes, among other components, a layer 12 of liquid crystal material which changes the way in which it acts on light in response to predetermined changes in voltage across the layer, whereby to modulate the light so acted upon. The spatial light modulator also includes an arrangement 14 for applying a light modulating voltage V(LC) across layer 12 and for modulating voltage V(LC) during a given modulation period in order to modulate the light acted upon by the liquid crystal material during the light modulation period. While not shown, it is to be understood that overall spatial light modulator 10 includes other, conventional components which do not form part of the present invention per se. For purposes of brevity, those other components some of which are obvious to those skilled in the art, will not be described herein.

In a preferred embodiment of the present invention, the liquid crystal material making up layer 12 is conventional and readily providable ferroelectric liquid crystal material and the thickness of this layer is about 1 μm. It is to be understood, however, that the present invention is not limited either to ferroelectric liquid crystal or the thickness just recited. Examples of other liquid crystal materials that could be utilized are nematic, electroclinic, and deformable-helix ferroelectric.

Still referring to FIG. 1, drive arrangement 14 will now be described in more detail. At the outset, it is to be understood that the individual components making up this arrangement are not per se new but rather can be provided by those with ordinary skill in the art. In a preferred embodiment, these components are realized as a silicon integrated circuit provided in accordance with established processing techniques which uses, for example VLSI (very large scale integration-)implementation. With this in mind, arrangement 14 is shown including a non-linear capacitor 16 which, in the embodiment depicted, is actually a MOS transistor having its source and drain tied together at node 9 and its gate or plate connected to node 5. As can be seen from FIG. 1, capacitor 16 is connected on one side (node 9) with one side of liquid crystal layer 12 such that the light modulating voltage V(LC) across the layer at any given point in time during its modulation period is a function of the voltage across capacitor 16 at that time.

Figure 3:
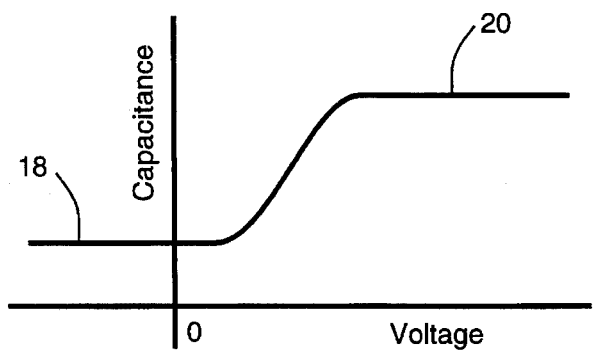
FIG. 3 graphically depicts the capacitance of a specific non-linear drive capacitor forming part of the overall modulator illustrated in FIG. 1 as a function of voltage.

In addition to capacitor 16, arrangement 14 includes a voltage coupling scheme for changing the voltage across the capacitor during the modulation period in a way which changes the capacitance of the capacitor and thereby capacitively couples at least a part of the change in voltage across the capacitor to the layer 12 of liquid crystal material. In this regard, it is important to remember that capacitor 16 is a non-linear capacitor and, therefore, its capacitance varies as a function of voltage in the manner generally illustrated in FIG. 3. As seen there, as the voltage across the capacitor increases there is a sudden jump from a relatively low capacitance indicated generally at 18 to a relatively high capacitance indicated at 20. While it is known that non-linear capacitors of the MOS type or the like operate in this manner, the present invention takes advantage of this characteristic by changing the capacitance during the modulation period, as will become apparent hereinafter.

The voltage coupling scheme just recited generally is shown in FIG. 1 including suitable and readily providable addressing means generally indicated at 22 for presenting a digital data or address voltage 24 at node 6 during given modulation periods of modulator 10. In the embodiment illustrated, the digital or address voltage 24 is either high (for example +5 volts) or low (for example 0 volts) or, in binary language, it is either a 1 or a 0.

The voltage coupling scheme forming part of drive arrangement 14 also includes an isolation switch 26 which is formed from a transistor having its source and drain connected in series with nodes 6 and 9, as illustrated in FIG. 1, and its gate connected to node 7. This isolation switch is driven between a conducting or ON state and a non-conducting or OFF state by suitable and readily providable means generally indicated at $\phi\omega$ for presenting a high voltage level, for example +5 volts, or a low voltage level, for example −5 volts, at node 7. When the voltage on node 7 is high, switch 26 conducts and when the voltage at node 7 is brought low, the switch turns off. Suitable means for providing a similar voltage swing, that is between for example +5 and −5 volts, is generally indicated at $\phi\rho$. Means $\phi\rho$ is connected to the gate of capacitor 16 at node 5 and, as will be seen, serves as the capacitor drive voltage for capacitor 16. This latter means, like means $\phi\omega$ and addressing means 22 forms part of the overall voltage coupling scheme which, in turn, forms part of overall arrangement 14. This scheme also includes means generally indicated at $V_f$ for applying a fixed voltage, for example 0 volts, to node 1 which is connected to the side of liquid crystal layer 12 opposite capacitor 16.

Figure 2:
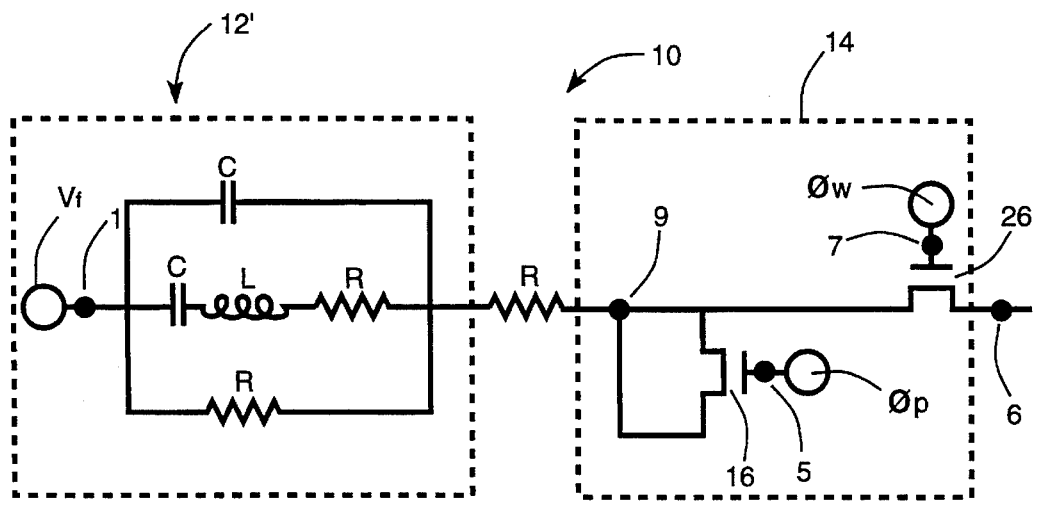
FIG. 2 is a schematic illustration similar to FIG. 1 but specifically depicting a circuit equivalent to a layer of liquid crystal material forming part of the overall spatial light modulator or pixelated segment shown in FIG. 1.

Referring to FIG. 2, the overall spatial light modulator 10 is illustrated again. However, its liquid crystal layer 12 is shown by means of an equivalent circuit generally indicated at 12'. As seen there, the liquid crystal layer is a ferroelectric liquid crystal layer simulated as a 4 fF capacitor in parallel with a 1 TΩ resistor. An additional series RLC combination with R-1 GΩ, L=5kH, and C=10 fF simulates the switching of the polarization in response to a step voltage reversal.

Figure 4A:
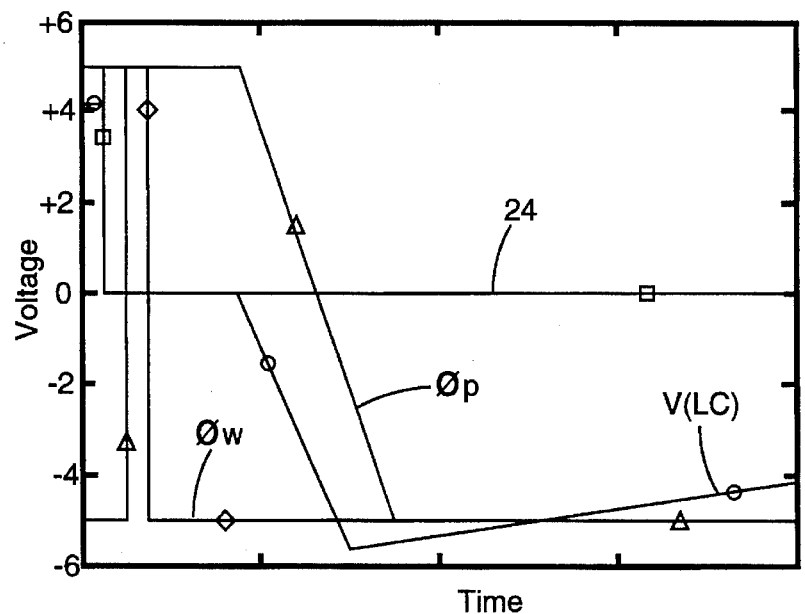
FIGS. 4a and 4b graphically illustrate various operational characteristics of the spatial light modulator of FIG. 1 in terms of voltage as a function of time.

Having described overall liquid crystal spatial light modulator 10 from a structural standpoint, attention is now directed to the way in which it operates in order to modulate light acted upon by the liquid crystal layer. In this regard, for purposes of discussion, the following assumptions are made. First, the capacitor 16 and switch 26 are made from n-channel transistors, although they could be made from p-channel transistors. Second, it will be assumed that the data or address voltage 24 swings between 0 and +5 volts; the voltage $\phi\omega$ for driving switch 26 swings between +5 volts and −5 volts; the voltage swing $\phi\rho$ for driving capacitor 16 swings between +5 volts and −5 volts; and the fixed voltage $V_f$ at node 1 is +5 volts. Finally, it will also be assumed that the presence of a low data or addressing voltage 24 (0 volts) causes the liquid crystal layer 12 to read dark and the presence of a high data or addressing voltage (+5 volts) causes the liquid crystal layer to read light. With these assumptions in mind, the way in which arrangement 14 switches liquid crystal layer 12 from a light state to a dark state will now be described in conjunction with FIG. 4a which shows a SPICE simulation of the time responses of the data or addressing voltage 24, the voltage V(LC) across the liquid crystal layer 12, and the voltages $\phi\omega$ and $\phi\rho$ applied to nodes 7 and 5, respectively. As illustrated in FIG. 4a, $\phi\omega$ is initially in its high state which means that switch 26 is on. At this time, data or addressing voltage 24, in its low state (0 volts) is presented to node 6. Because switch 26 is on, that is conducts, 0 volts appears at node 9, that is, on the side of capacitor 16 closest to the liquid crystal layer 12. At this time, praises the opposite side of the capacitor (node 5) from −5 volts to +5 volts which raises the gate of the transistor forming the capacitor 16 above threshold which, in turn, causes the capacitance of the capacitor to go high, that is, to appear somewhere on the high segment 20 of the curve illustrated in FIG. 3. At this point in time, the voltage $\phi\omega$ is lowered to −5 volts, thereby turning switch 26 off which, in turn, isolates node 9 from node 6 and means 22. With node 9 so isolated the voltage $\phi\rho$ at node 5 swings low, that is, to −5 volts, lowering the capacitance of the capacitor and thereby capacitively coupling this swing in voltage onto liquid crystal layer 12 so that the latter swings low, again as illustrated in FIG. 4a. By this means, the peak to peak voltage swing across liquid crystal layer 12 can be made larger than the maximum voltage of the data or addressing voltage 24.

Figure 4B:
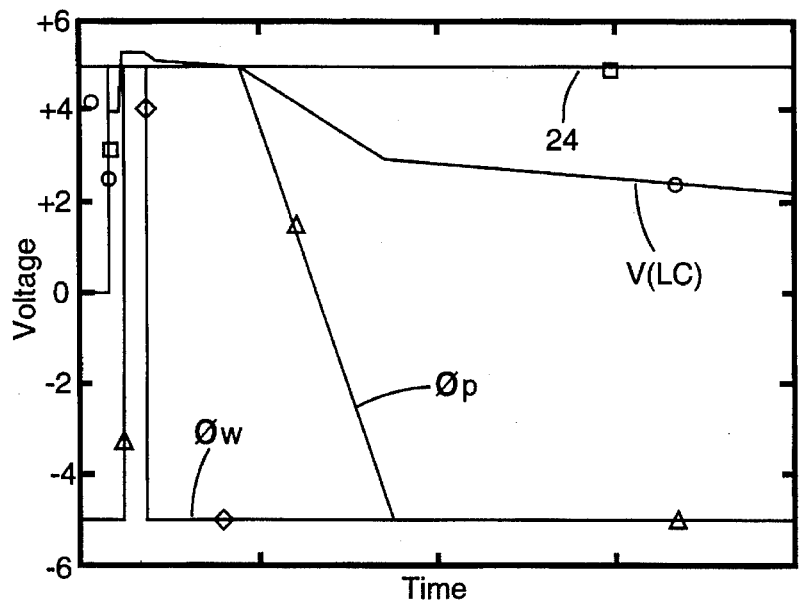

FIG. 4b shows a similar SPICE simulation of the way arrangement 14 switches the liquid crystal layer 12 from a dark state to a light state. As illustrated, $\phi\omega$ is again initially in its high state so that switch 26 conducts and addressing voltage 24, which goes to its high state, is presented to node 6. Because switch 26 is on, +5 volts appears at node 9, that is on the side of capacitor 16 closest to the liquid crystal layer 12. At this time $\phi\rho$ raises the opposite side of the capacitor (node 5) from −5 volts to +5 volts. Because the source and drain of the transistor forming capacitor 16 are already at +5 volts, the transistor remains below threshold, and the capacitance of the capacitor remains low, that is to appear somewhere on the low segment 18 of the curve illustrated in FIG. 3. At this time the voltage $\phi\omega$ is again lowered to −5 volts, thereby turning switch 26 off which in turn isolates node 9 from node 6 and means 22. With node 9 so isolated, the voltage $\phi\rho$ at node 5 swings low, that is to −5 volts. Since capacitor 16 has low capacitance, very little of the voltage swing at node 5 is now coupled onto liquid crystal layer 12, so that the voltage at node 9 remains high or nearly at +5 volts.

As described above in conjunction with FIGS. 4a and 4b, the same sequence of the various voltages can switch the liquid crystal to a light state from a dark state (or leave the initially dark liquid crystal in the same state), or switch the liquid crystal from a dark state to a light state (or leave the initially light liquid crystal in the same state), depending only on the value of the data voltage applied at node 6. A slightly different mode of operation may be preferred in cases where effective switching of the liquid crystal requires a large amount of electrical charge. In this case, the fact that capacitor 16 is in its low-capacitance state means that most of the charge needed for switching from the dark state to the light state according to the above mode of operation would have to be provided by the capacitance of the liquid crystal layer 12, itself. Alternately, either the dark or the light state of the liquid crystal could be obtained by first resetting the liquid crystal to the light state and then proceeding to switch to the dark state (or leave the liquid crystal in the light state) according to the mode of operation described above. The reset operation that may be used to first bring the liquid crystal to the light state is carried out by presenting data or addressing voltage 24 in its high state to node 6. Then voltage $\phi\omega$ is held high for a time sufficient for the liquid crystal to switch completely from the dark state to the light state. In this way, any necessary charge can be supplied by conduction through switch 26 rather than out of storage on capacitor 16.

According to the first mode of operation described above (that is without reset), the liquid crystal may be switched to either state on any cycle simply by choice of the value of the data voltage 24. According to the second mode described immediately above, the liquid crystal is first reset to its light state. The switching cycle then continues as described for the first mode, with the ultimate state of the liquid crystal determined again only by the value of the data voltage. Now very little charge is needed to keep the liquid crystal in its light state, and if switching to the dark state is desired, sufficient charge stored in capacitor 16 is available because that capacitor is placed in its high-capacitance state by the switch-to-dark cycle.

The preferred mode of voltage coupling can best be effected if the high-capacitance state of capacitor 16 has a capacitance value large in comparison to that of liquid crystal layer 12 while the low-capacitance state of capacitor 16 has a capacitance value small in comparison to that of liquid crystal layer 12.

Figure 5:
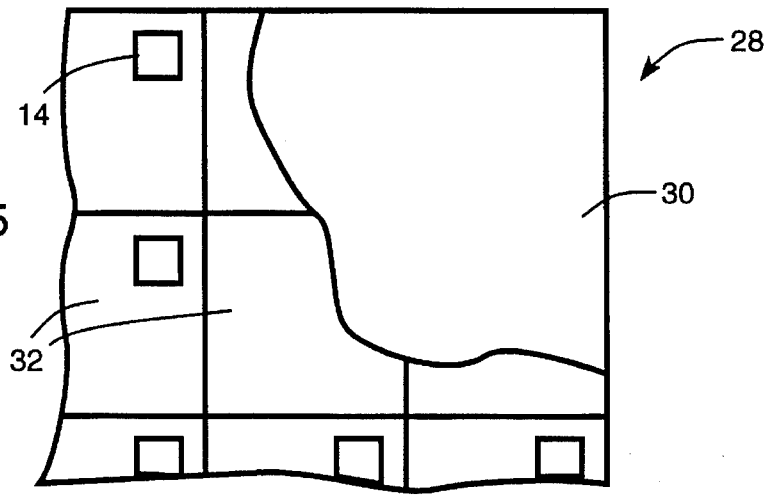
FIG. 5 diagrammatically illustrates part of an overall active matrix liquid crystal spatial light modulator including individual pixelated segments corresponding to the one illustrated in FIG. 1, the pixelated segments being arranged in a matrix of rows and columns.

Having described liquid crystal spatial light modulator 10, both structurally and operationally, attention is now directed to FIG. 5 which illustrates part of an overall active matrix liquid crystal spatial light modulator 28 which, like modulator 10, includes a corresponding, overlying liquid crystal layer 30. Liquid crystal layer 30 is functionally divided into an array of adjacent pixel segments 32 arranged in a matrix of rows and columns. As illustrated, each pixel segment 32 includes its own arrangement 14 as described above. Thus, each pixel segment 32 includes its own individual capacitor 16 and associated nodes 5 and 9, its own switch 26 and associated node 7, and its own addressing node 6. In the particular embodiment illustrated, the columns are actually shown horizontally and include bit lines which contain the nodes 6 for individual data or addressing voltages 24. At the same time, the vertical rows contain nodes 5 and 7 so that the swing voltages $\phi\rho$ and $\phi\omega$ can be simultaneously applied to a given vertical row. In this way, one row at a time can be addressed by first presenting and validating the data or addressing voltages at each column and then selecting a particular row, for example the center vertical row shown in FIG. 5 and thereafter driving the voltages $\phi\rho$ and $\phi\omega$ in the manner described in conjunction with FIG. 1.

Having described liquid crystal spatial light modulators 10 and 28 and the way in which they operate, it is to be understood that the present invention is not limited to the particular circuitry making up these spatial light modulators. For example, while the transistors forming capacitor 16 and switch 26 were described as n-channel transistors, they could just as well be p-channel transistors, as stated previously. Under these circumstances, the wave forms illustrated in 4a and 4b would change accordingly, as is obvious to those with ordinary skill in the art. Moreover, the present invention is not limited to the particular voltages levels recited. What is important is that the overall spatial light modulator have the capability to boost the voltage across the liquid crystal material without having to boost the data or address voltage. This is accomplished in accordance with the present invention by providing voltage coupling means for changing the voltage across capacitor 16 during the modulation period of its associated liquid crystal layer or pixel segment in a way which changes the capacitance of capacitor 16 and thereby capacitively couples at least a part of the change in the voltage across the capacitor to its associated liquid crystal layer or pixel segment. In the particular embodiment illustrated, this is accomplished by driving one side of capacitor 16 through a predetermined voltage swing in timed relationship with the presence of the data or addressing voltage 24 at the opposite side of the capacitor, that is, between the capacitor and the liquid crystal material.

What is claimed is:

1. An active matrix liquid crystal spatial light modulator comprising:

(a) a layer of liquid crystal material which acts on light in certain ways in response to predetermined changes in voltage across the layer, whereby to modulate the light so acted upon, said layer of liquid crystal material being functionally divided into an array of adjacent pixel segments arranged in a predetermined way; and (b) means for applying a modulating voltage across the adjacent pixel segments of said layer of liquid crystal material and for individually changing the modulating voltage across each pixel segment during any given modulation period, said pixel modulating means including (i) an array of non-linear capacitors, each of which has a first side electrically connected with one side of an associated one of the adjacent pixel segments of said layer of liquid crystal material such that said modulating voltage across each of said pixel segments at any given point in time during the given modulation period is a function of a capacitor voltage across said pixel segment's associated capacitor at the given point in time, and (ii) voltage coupling means for changing said capacitor voltage across any given one of said capacitors during the modulating period of said capacitor's associated pixel segment in a way which capacitively couples at least a part of any change in said capacitor voltage across the given capacitor to the associated pixel segment, said voltage coupling means includes pixel addressing means for applying a digital data voltage to said first side of the given capacitor during the modulation period of the pixel segment associated with the given capacitor, said digital data voltage having a maximum voltage level which is less than a maximum change in voltage capacitively coupled from the capacitor to the associated pixel segment during the modulation period of the associated pixel segment, wherein said pixel addressing means applies said digital data voltage to said first side of each capacitor and wherein said voltage coupling means includes capacitor drive means for applying a voltage change to a second opposite side of each capacitor during the modulation period of the associated pixel segment, said voltage change being larger than the maximum level of said digital data voltage applied to said first side of the capacitor.

2. A spatial light modulator according to claim 1 wherein, during the modulation period of the pixel segment associated with the given capacitor and after the digital data voltage has been applied to the given capacitor, said voltage coupling means includes isolating means for electrically isolating said capacitor from said pixel addressing means.

3. A spatial light modulator according to claim 2 wherein, during the modulation period of the pixel segment associated with the given capacitor, the voltage coupling means capacitively couples at least some of the voltage from the given capacitor to the associated pixel segment by (i) causing said pixel addressing means to apply digital data voltage to said first side of the given capacitor, (ii) causing the capacitor drive means to raise the voltage at said second side of the given capacitor to a high level, (iii) causing said isolating means to isolate said given capacitor from said pixel addressing means, and (iv) causing the capacitor drive means to lower the voltage at said second side of the particular capacitor to a low level.

4. A spatial light modulator according to claim 3 wherein said digital data voltage applied to said first side of the given capacitor is either 0 volts or +5 volts, wherein the voltage change applied by said capacitor drive means to said second side of the given capacitor results from a change in voltage between +5 volts and −5 volts, and wherein said voltage coupling means includes means for applying a fixed voltage of +5 volts to a side of the associated pixel segment opposite said one side.

5. A spatial light modulator according to claim 4 wherein said isolating means includes a transistor associated with each of said pixel segments and means for applying a voltage change between −5 volts and +5 volts to each transistor for causing said transistor to conduct or not conduct.

6. A spatial light modulator according to claim 2 wherein said array of pixel segments is arranged in a matrix of rows and columns.

7. A spatial light modulator according to claim 6 wherein said pixel addressing means includes means for simultaneously applying individual digital data voltages to said first sides of the capacitors associated with said pixel segments making up a given column, wherein said capacitor drive means includes means for simultaneously applying the same voltage change to said second sides of all of the capacitors associated with the pixel segments making up a given row, and wherein said isolating means includes means for simultaneously electrically isolating the capacitors associated with all of the pixel segments making up a given row from said pixel addressing means.

8. In a liquid crystal spatial light modulator including a layer of liquid crystal material which acts on light in certain ways in response to predetermined changes in voltage across the layer, whereby to modulate the light so acted upon, an arrangement for applying a light modulating voltage across said layer of liquid crystal material and for modulating said voltage during a given modulation period in order to modulate the light acted upon by the liquid crystal material during said period, said arrangement comprising:

(a) a non-linear capacitor which has a first side electrically connected with one side of said layer of liquid crystal material such that the voltage across each of said pixel segments at any given point in time during said modulation period is a function of a capacitor voltage across its associated capacitor at the given point in time, and (b) voltage coupling means for changing said capacitor voltage across said capacitor during the modulating period of its associated pixel segment in a way which capacitively couples at least a part of any change in voltage across the capacitor to the layer of liquid crystal, wherein said voltage coupling means includes pixel addressing means for applying a variable data voltage to said first side of the capacitor during the modulation period, said variable data voltage having a maximum voltage level which is less than a maximum change in voltage capacitively coupled from the capacitor to said liquid crystal layer during the modulation period, and wherein said pixel addressing means applies said variable data voltage to said first side of said capacitor and wherein said voltage coupling means includes capacitor drive means for applying a voltage change to a second, opposite side of each capacitor during the modulation period, said voltage change being larger than the maximum level of said variable data voltage applied to said first side of the capacitor.

9. An arrangement according to claim 8 wherein, during the modulation period of said liquid crystal layer and after the variable data voltage has been applied to the capacitor, said voltage coupling means includes isolating means for electrically isolating said capacitor from said pixel addressing means.

10. In a liquid crystal spatial light modulator including a layer of liquid crystal material which acts on light in certain ways in response to predetermined changes in voltage across the layer, whereby to modulate the light so acted upon, an arrangement for applying a light modulating voltage across said layer of liquid crystal material and for modulating said voltage during a given modulation period in order to modulate the light acted upon by the liquid crystal material during said period, said arrangement comprising:

(a) a non-linear capacitor which has one side electrically connected with one side of said layer of liquid crystal material such that the light modulating voltage across the layer at any given point in time during the modulation period is a function of a capacitor voltage across said capacitor at the given point in time, (b) means for applying an addressing voltage to said one side of said capacitor during the given modulation period while a second, opposite side of the capacitor is at a particular voltage; and (c) means for changing the voltage at the opposite side of said capacitor during the given modulation period.

* * * * *